US012646873B2

(12) United States Patent
Cartier, Jr. et al.

(10) Patent No.: US 12,646,873 B2
(45) Date of Patent: Jun. 2, 2026

(54) HIGH DENSITY, HIGH SPEED ELECTRICAL CONNECTOR

(71) Applicant: Amphenol Corporation, Wallingford, CT (US)

(72) Inventors: Marc B. Cartier, Jr., Durham, NH (US); John Robert Dunham, Windham, NH (US); Mark W. Gailus, Concord, MA (US); John Pitten, Merrimack, NH (US); David Levine, Amherst, NH (US); Vysakh Sivarajan, Nashua, NH (US)

(73) Assignee: Amphenol Corporation, Wallingford, CT (US)

( * ) Notice: Subject to any disclaimer, the term of this patent is extended or adjusted under 35 U.S.C. 154(b) by 571 days.

(21) Appl. No.: 18/078,720

(22) Filed: Dec. 9, 2022

(65) Prior Publication Data

US 2023/0187861 A1 Jun. 15, 2023

Related U.S. Application Data

(60) Provisional application No. 63/289,566, filed on Dec. 14, 2021.

(51) Int. Cl.

*H01R 12/71* (2011.01)
*H01R 12/70* (2011.01)

(Continued)

(52) U.S. Cl.

CPC ....... *H01R 12/716* (2013.01); *H01R 12/7047* (2013.01); *H01R 13/08* (2013.01); *H01R 13/6585* (2013.01)

(58) Field of Classification Search

CPC .. H01R 12/716; H01R 12/7047; H01R 13/08; H01R 13/6585; H01R 13/6586;

(Continued)

(56) References Cited

U.S. PATENT DOCUMENTS 9,545,004 B2 1/2017 Minich et al.
D948,454 S 4/2022 Cartier, Jr. et al.

(Continued)

*Primary Examiner* — Tulsidas C Patel
*Assistant Examiner* — Carlos E Lopez-Pagan
(74) *Attorney, Agent, or Firm* — Wolf, Greenfield & Sacks, P.C.

(57) ABSTRACT

A dense, high-speed interconnection may be formed with a mating header and receptacle connector. The header connector may have groups of mating contact portions extending from the connector housing. Structural projections may extend from the housing adjacent some or all of the groups of mating contact portions. The groups of mating contact portions may be signal and ground mating contact portions associated with a signal pair. The groups may be arranged in an array and the structural projections may be arranged in an array intercalated with the array of the groups of mating contact portions. A receptacle connector may include an array of apertures configured to receive the structural projections. The structural projections may be shaped and positioned to reduce damage to the mating contact portions of the header connector, enable reliable manufacture, and to provide a high-density mating interface.

26 Claims, 10 Drawing Sheets

(51) Int. Cl.
*H01R 13/08* (2006.01)
*H01R 13/6585* (2011.01)

(58) Field of Classification Search
CPC .. H01R 13/6587; H01R 12/737; H01R 12/71; H01R 13/631; H01R 13/46; H01R 13/629
USPC .................................................. 439/605, 607
See application file for complete search history.

(56) References Cited

U.S. PATENT DOCUMENTS

| | | | | |
|---|---|---|---|---|
| D953,275 | S | 5/2022 | Cartier, Jr. et al. | |
| 2003/0119379 | A1* | 6/2003 | Avery | H01R 13/6471 439/701 |
| 2010/0178779 | A1* | 7/2010 | Davis | H01R 12/737 439/65 |
| 2020/0373689 | A1 | 11/2020 | Cartier et al. | |
| 2021/0234290 | A1* | 7/2021 | Dunham | H01R 12/57 |
| 2021/0257788 | A1* | 8/2021 | Cartier, Jr. | H01R 12/51 |
| 2023/0187859 | A1* | 6/2023 | Trout | H01R 12/7076 439/78 |

* cited by examiner

HIGH DENSITY, HIGH SPEED ELECTRICAL CONNECTOR

CROSS-REFERENCE TO RELATED APPLICATIONS

This application claims priority to and the benefit of U.S. Provisional Application Ser. No. 63/289,566, filed on Dec. 14, 2021, entitled "HIGH DENSITY, HIGH SPEED ELECTRICAL CONNECTOR." The contents of this application are incorporated herein by reference in their entirety.

FIELD

This patent application relates generally to interconnection systems, such as those including electrical connectors, and more specifically to high speed and high-density connectors.

BACKGROUND

Electronic systems are assembled from multiple components that are interconnected. Often, components are mounted to printed circuit boards (PCBs), which provide both mechanical support for the components and conductive structures that deliver power to the components and provide signal paths between components attached to the PCB.

Sometimes PCBs are joined together with electrical connectors. The connectors provide a separable interface such that the PCBs in a system can be manufactured at different times or in different locations, yet simply assembled into a system. A known arrangement for joining several PCBs is to have one PCB serve as a backplane. Other PCBs, called "daughterboards" or "daughtercards," may be connected through the backplane.

Connectors may also be used in other configurations for interconnecting PCBs. Sometimes, one or more smaller PCBs may be connected directly to another larger PCB. In such a configuration, the larger PCB may be called a "motherboard" and the PCBs connected to it may be called daughterboards. In some systems, for example, the daughter boards are mounted with edges facing an edge of the motherboard. When the daughterboards are orthogonal to the motherboard, the system may be described as have a direct mate orthogonal configuration, and direct mate orthogonal connectors are designed to support this configuration. Alternatively, boards may sometimes be aligned in parallel. Connectors used to connect boards in this configuration are often called "stacking connectors" or "mezzanine connectors."

In some scenarios, components may be separated by a longer distance than can be connected via traces in a PCB. Cables may be used to route signals between components because cables can be routed through curving paths where it would be difficult to install a rigid PCB or can be manufactured with less signal loss per inch than a PCB. Cables may be terminated with connectors, forming a cable assembly. The connectors may plug into mating connectors that are in turn connected to the components to be connected.

Designing connectors that meet the demands of specific applications poses multiple challenges. Connectors, for example, must be configured to ensure that signals pass through the connectors with adequate integrity that the information represented by those signals can be reliably received at its intended destination within the electronic system. Additionally, the connector must have properties that meet the mechanical requirements of the system. A connector, for example, must reliably mate and stay mated when the components to be connected through the connector are assembled into an electronic system. Further, a connector often must enable a large number of signal paths through the electronic system, which can lead to requirements on the spacing of conductors within the connector as well to limitations on the footprint of the connector where it is mounted to a PCB or attached to a component within the electronic system. The challenges of connector design may be exacerbated because these limitations and requirements can be best met by different structures which often are not readily combinable in a single connector and because connector features that provide a benefit with respect to one requirement may have a negative impact with respect to other requirements.

SUMMARY OF THE DISCLOSURE

Embodiments of a high density, high speed electrical connector and associated modules and assemblies are described. In accordance with some embodiments, an electronic connector may comprise a housing comprising a face, and a plurality of conductive elements disposed in the housing. The plurality of conducive elements may comprise mating contact portions extending through the face. The electronic connector may further comprise a plurality of projections extending from the face, each of the plurality of projections being disposed adjacent a respective subset of the plurality of conductive elements.

In accordance with some embodiments, a subset of the plurality of conductive elements may comprise, a first conductive element of the plurality of conductive elements, a second conductive element of the plurality of conductive elements that is separated from the first conductive element by a gap along a first line, and a first projection of the plurality of projections disposed in the gap between the first conductive element and the second conductive element.

In accordance with some embodiments, the first projection may be dog bone shaped.

In accordance with some embodiments, the electrical connector may further comprise a second projection separated from the first projection along the first line such that the first conductive element is disposed between the first projection and the second projection.

In accordance with some embodiments, the electrical connector may further comprise a third projection, of the plurality of projection, that is separated from the first projection along a second line, and a fourth projection, of the plurality of projections, that is separated from the first projection along a third line, wherein the third line is orthogonal with the second line, such that the first conductive element is disposed between the third projection and the fourth projection.

In accordance with some embodiments, the second line is rotated relative to the first line by 30-60 degrees.

In accordance with some embodiments, the first projection and the second projection are oriented along the first line and the third projection, and the fourth projection are oriented along lines parallel with the first line.

In accordance with some embodiments, at least one projection, of the plurality of projections is longer than the first conductive element.

In accordance with some embodiments, an electronic connector may comprise a housing comprising a face, and a plurality of conductive elements disposed in the housing. The plurality of conductive elements may comprise mating contract portions exposed through openings in the face. The electronic connector may further comprise a plurality of apertures extending into the face, each of the plurality of apertures being disposed adjacent a respective subset of the plurality of conductive elements.

In accordance with some embodiments, the subset of the plurality of conductive elements may comprise a first conductive element of the plurality of conductive elements, a second conductive element of the plurality of conductive elements that is separated from the first conductive element by a gap along a first line, and a first aperture disposed in the gap between the first conductive element and the second conductive element.

In accordance with some embodiments, the first aperture may be dog bone shaped.

In accordance with some embodiments, the electrical connector may further comprise a second aperture separated from the first aperture along the first line such that the first conductive element is disposed between the first aperture and the second aperture.

In accordance with some embodiments, the electrical connector may further comprise a third aperture, of the plurality of apertures, that is separated from the first aperture along a second line; and a fourth aperture, of the plurality of apertures, that is separated from the first aperture along a third line, wherein the third line is orthogonal with the second line, such that the first conductive element is disposed between the third aperture and the fourth aperture.

In accordance with some embodiments, the second line may be rotated relative to the first line by 30-60 degrees.

In accordance with some embodiments, the first aperture and the second aperture may be oriented along the first line, and the third aperture and the fourth aperture may be oriented along lines parallel with the first line.

In accordance with some embodiments, an electronic system may comprise a first connector and a second connector mated to the first connector. The first connector may comprise a first housing comprising a first face, a first plurality of conductive elements disposed in the first housing, wherein the first plurality of conductive elements may comprise mating contact portions extending through the first face. The first connector may further comprise a plurality of projections extending from the first face, each of the plurality of projections being disposed adjacent a respective subset of the first plurality of conductive elements. The second connector comprising a second housing comprising a second face, a second plurality of conductive elements disposed in the second housing, wherein the second plurality of conductive elements comprises mating contact portions exposed through openings in the second face. The second connector may further comprise a plurality of apertures extending into the second face, each of the plurality of apertures being disposed adjacent a respective subset of the second plurality of conductive elements, wherein the subsets of the first plurality of the conductive elements are mated to the subsets of the second plurality of conductive elements and the plurality of projection extend into the plurality of apertures.

In accordance with some embodiments, the subset of mated pairs comprises a subset of the first plurality of conductive elements mated to a subset of the second plurality of conductive elements. The subset of mated pairs may further comprise a first mated pair and a second mated pair separated from the first mated pair by a gap along a first line, and a first projection extending into a first aperture disposed in the gap between the first mating pair and the second mating pair.

In accordance with some embodiments, the first projection and the first aperture may each be dog bone shaped.

In accordance with some embodiments, the subset of mated pairs may further comprise a third mated pair and a fourth mated pair separated from the third mated pair by the gap along a second line, the second line being orthogonal to the first line, and wherein the first projection and the first aperture may be disposed at the intersection between the first line and the second line.

In accordance with some embodiments, the mated pairs of the subset of the mated pairs may be disposed in a rectangular array.

The foregoing summary is not intended to be limiting. Moreover, various aspects of the present disclosure may be implemented alone or in combination with other aspects. Further, the features described in connection with one exemplary embodiment may be incorporated in other embodiments.

BRIEF DESCRIPTION OF FIGURES

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein. In the drawings.

DETAILED DESCRIPTION

Figure 1:
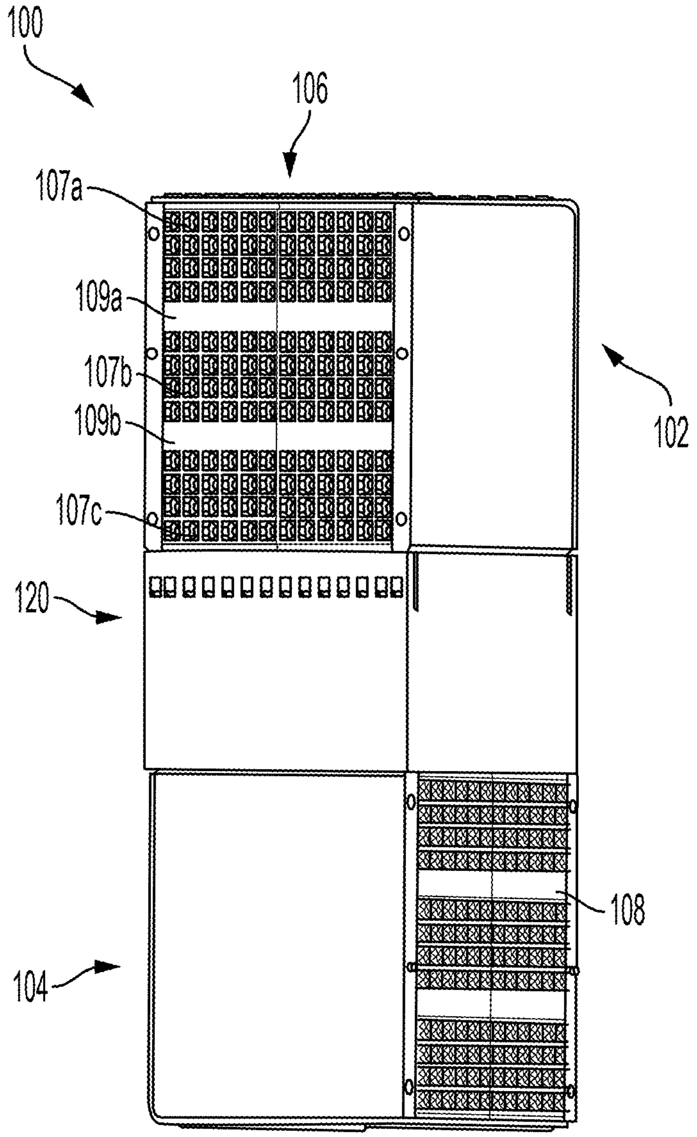
FIG. 1 is a perspective view of an interconnection system with a mated header and receptacle connector, in accordance with some embodiments.

The inventors have recognized and appreciated techniques for making robust, high-density electrical connectors for high-speed signals that can be manufactured with low cost.

As processing power increases, so too does demand for higher bandwidth electrical connectors. To address the demand for increased bandwidths, connectors that operate at higher speeds and have greater numbers of conductive elements to provide an increased number of independent signal paths may be used. To avoid taking up large amounts of valuable space on printed circuit boards (PCBs), these connectors may be implemented with smaller conductive elements, arranged with a higher density.

The inventors have appreciated that providing electrical connectors with a high-density of conductive elements provides challenges. For example, in a separable connector, the conductive elements may have a mating contact portion at a first connector mating interface (see 110 in FIG. 2A), configured to make a connection to a complementary mating contact portion of a conductive element at a second mating interface of a mating connector (see 130 in FIG. 2B). The mating contact portion of one connector may extend from a housing of that connector so that it may mate with a receptacle contact portion of a second connector. The extending mating contact portion, which may be shaped as a pin, is susceptible to damage from lateral forces on the mating contact portions that occur when mating to a receptacle contact portion exposed through an opening that is misaligned with the extending mating contact portions. As pin size gets smaller, the pins may be more susceptible to damage from lateral forces.

Conventional connectors may include alignment features on their housings such that mating connectors may be guided into coarse alignment. However, the variability of relative position between coarsely aligned mating connectors can still result in a relatively large force applied to the pins as the connectors are mated, particularly as the mating structures are reduced in size to support a higher density of interconnects. Further, with a high-density of pins, the space available to make the pins larger and more robust is limited.

The challenges of incorporating robust structures may be exacerbated by the configuration of the mating interface of a connector. Some right-angle connectors, for example, include twisted pairs of conductors to enable broadside coupling of the pair within the right-angle portion of the connector while enabling edge coupling at the mounting interface. Regions of the pairs of signal conductors with a full 90 degrees of twist between broadside and edge coupled pairs of signals conductors, however, may be undesirable in some circumstances. Accordingly, a high performance and high-density connector may have individual signal modules, each with a pair of signal conductors terminating with a pair of pins at the mating interface. These modules may be arranged in rows and/or columns. To lessen the amount of twist in the transition between broadside coupled intermediate portions of the signal conductors and the pins at the mating interface, the pairs of pins may be oriented at an acute angle, such as 45 degrees, with respect to the row or column direction. Such angled mating interfaces, while providing improved signal integrity to the connector, may create additional geometric constraints on structures used for making a more robust mating interface.

The inventors have recognized and appreciated designs for high-density mating interfaces that include pin protecting structures that can be manufactured at low cost and may increase the robustness of a mating interface, even with angled pairs of pins. These structures may be protrusions extending from the connector housing adjacent the pins. A mating connector may have apertures in its housing adjacent openings configured to receive the pins. The apertures may have a shape complementary to the projections and may serve to more finely align the pins and the openings to the receptacle contacts, reducing the potentially damaging forces on the pins during mating. The protrusions may also block objects that might apply a large force to the pins from contacting the pins.

In some embodiments, the protrusions may be shaped such that they provide suitable support and/or protection of the pins in a limited space. The protrusions may be dog bone shaped, for example. In some embodiments, the pins of a connector may be arranged in pairs and the protrusions may be elongated in a direction that is perpendicular to an elongated axis of the pairs of pins. Such a structure enables robust protrusions that, themselves, can withstand forces yet can fit within the space available among the pairs of pins.

In accordance with some embodiments, an electronic system may include a first connector and a second connector. The first connector may include a first housing having a first face with multiple conductive elements disposed in the first housing. The conductive elements may include mating contact portions that extend through the first face. The first connector may also include multiple projections extending from the first face, each of the projections being disposed adjacent a respective subset of the conductive elements.

The second connector may be configured for mating to the first connector. The second connector may include a second housing having a second face with multiple conductive elements disposed in the second housing. The conductive elements may include mating contact portions exposed through openings in the second face and configured to mate with the first conductive elements disposed in the first housing. The second connector also includes multiple apertures extending into the second face, each of the apertures being disposed adjacent a respective subset of the conductive elements of the second connector. When mated, the projections on the first face of the first connector extend into the apertures on the second face of the second connector, providing protection to the conductive elements of the first and second connectors during the mating process.

An exemplary connector configuration is shown in FIG. 1, which is a view of a portion of an interconnection system 100, in accordance with some embodiments. Interconnection system 100 includes a first electrical connector 102 and second electrical connector 104 mated with the first electrical connector extender shell 120. The first electrical connector 102, for example, may be a header connector and connector 104 may be a receptacle connector. In the header connector, mating contact portions of the conductive elements within the connector may extend from the connector housing. In the receptacle connector, mating contact portions of the conductive elements within the connector may be within openings in the connector housing. Upon mating, the projecting mating contact portions of the header connector may enter the openings in the receptacle connector for mating to the mating contact portions of the receptacle connector.

In the configuration illustrated in FIG. 1, the first connector 102 and second connector 104 are configured as orthogonal connectors. As shown in FIG. 1, first connector 102 includes a first mounting face 106 configured to make electrical connections to a PCB in a first plane. To provide orthogonal connections, second connector 104 includes a second mounting face 108 configured to make electrical connections to a PCB in a second plane oriented differently than the first plane. As shown in FIG. 1, the first plane and the second plane may be orthogonal such that, when mated, the two connectors are configured to provide an orthogonal interconnection system 100. In other embodiments, the first connector and the second connector may be configured to provide other types of interconnectors. For example, the mating connectors may be configured as parallel connectors or right-angle connector, or, either or both of the connectors may be configured to terminate a cable or be mounted to a substrate other than a PCB. Accordingly, it should be appreciated that the mating interfaces as described herein may be utilized with connectors configured for any of a number of uses.

In some embodiments, mounting faces 106 and 108 include an array of tails 107. The tails may be formed at an end of the conductive elements within the connector. When connectors 102 and 104 are mated, electrical connections may be established between mounting face 106 and 108, and the PCBs or other components to which the tails are connected at their mounting faces, through the mated connectors.

In some embodiments, the array of mounting tails may include spaces 109 between subarrays of mounting tails. The inventors have recognized and appreciated that high-density electrical connectors may increase the cost of PCBs by increasing the number of conductive layers required to route conductive traces to connect to each of the conductive elements in the high-density electrical connector designed for carrying signals through the connector. To reduce layer count, the high-density electrical connectors illustrated in FIG. 1 have spaces between subarrays of mounting tails to provide additional space for routing conductive traces in a corresponding PCB. The gaps enable more traces connecting to conductive elements in the connector to be routed per layer. Accordingly, for some applications the high-density electrical connectors with gaps included on the mounting face may reduce the number of layers required in a PCB to provide connections to the high-density connector. For other applications, the gaps may not be included on the mounting face.

As shown in FIG. 1, mounting face 106 may include subarrays of tails 107*a*, 107*b*, and 107*c* separated on the mounting face by routing spaces 109*a* and 109*b*. In some embodiments, the routing spaces may be oriented differently. For example, vertical routing spaces between subarrays of mounting tails may be included in addition to, or as an alternative to the horizontal routing spaces 109*a* and 109*b* shown in FIG. 1.

In some embodiments, mounting faces 106 and 108 may have the same type tails. For example, the mounting faces 106 and 108 may each include an array of press fit contact tails configured to be mounted to PCBs. In other embodiments, however, the mounting faces 106 and 108 may have tails configured for different types of attachment to a PCB, cable or other component. For example, mounting face 106 may have tails configured to be soldered to pads on a surface of a PCB.

Figure 2B:
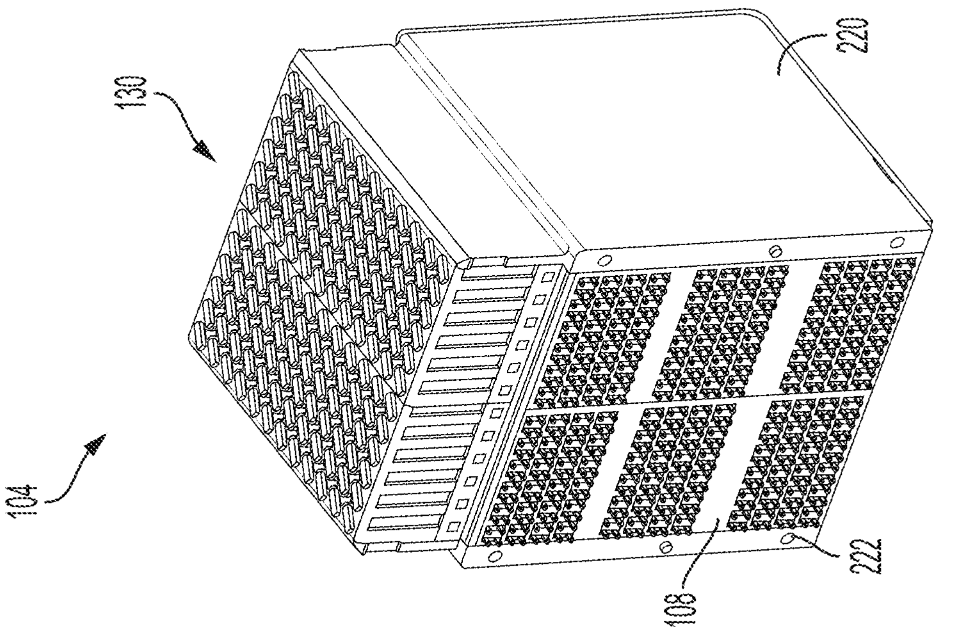
FIG. 2B is a perspective view of the receptacle connector of FIG. 1.
Figure 2A:
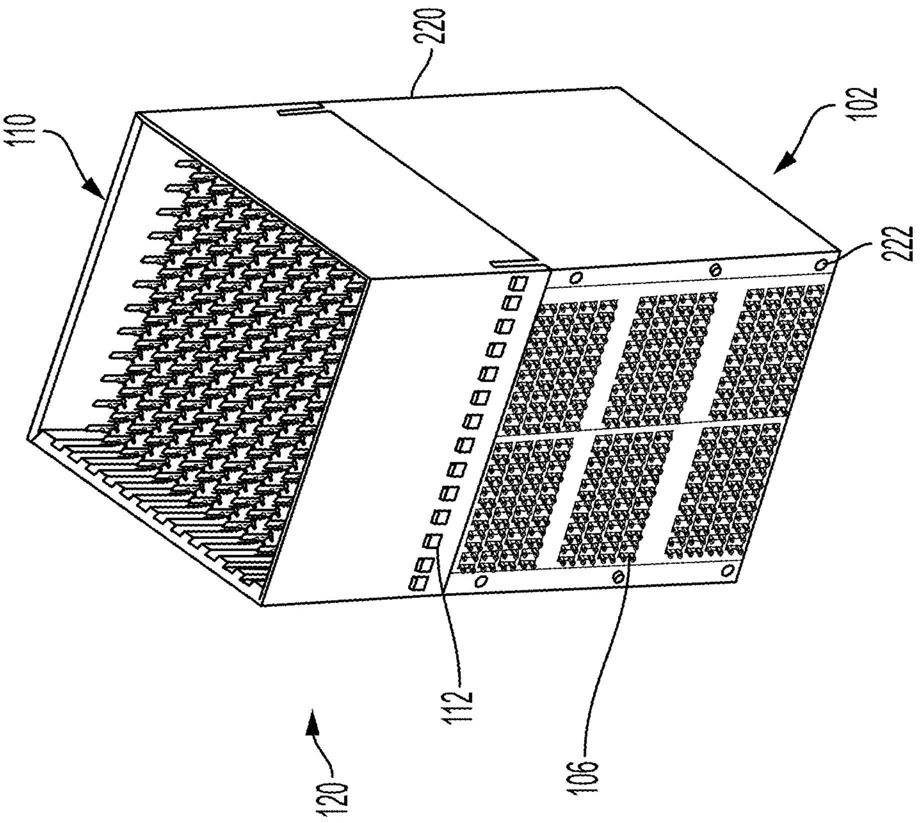
FIG. 2A is a perspective view of the header connector of FIG. 1.

As yet another example, some or all of the tails may be configured for making pressure mount contact to respective pads on surfaces of a PCB or other substrate. For example, FIGS. 2A and 2B illustrate connectors 102 and 104 with pressure mount tails for at least some of the conductive elements within the connector. The signal conductors, for example, may have pressure mount tails. Force to generate the required pressure at the mating interface may be made by screwing the connector to a PCB with screws passing through the PCB and engaging a housing of the connector. Connectors 102 and 104 may have a housing that includes at least a portion 220 in the example of FIGS. 2A and 2B, with holes 222 configured to receive screws. The holes 222, for example, may be threaded. The portions 220 may be made of metal, such as by die casting. The conductive elements may be positioned within insulative components, as described in greater detail below, to electrically insulate some or all of the conductive elements from housing portions 220, if those portions are formed of a conductive or partially conductive material.

Other packaging arrangements for mounting the connectors to PCBs may also be used, as aspects of the technology described herein are not limited in this respect. All of the tails at the mounting interface of one connector may have the same configuration, or, in some embodiments, a connector may have two or more types of contact tails at the mounting interface. For example, in some embodiments conductive elements configured as signal conductors may have pressure mount tails and conductive elements configured as ground conductors may have press fit contact tails.

FIG. 2A illustrates first connector 102, where the first connector has conductive elements for carrying signals with mating contact portions extending from the connector housing. For mating the first connector and the second connector, these mating contact portions may extend into receptacles of the second connector. As shown, the mating contact portions are disposed at mating interface 110. For example, mating interface 110 may include an array of mating contact portions within a mating cavity bounded by walls of extender shell 120. The mating interface may additionally include mating contact portions of conductive elements serving as ground conductors within the first connector 102. In the illustrated example, the pins are arranged in groups with one pair in each group. Mating contact portions of the ground conductors may be around each group. In the illustrated embodiment, the pins extend further from the housing than the ground conductors, but both may be exposed at the mating interface for mating to corresponding conductors in the second connector 104.

FIG. 2B is a perspective view of second connector 104 configured to mate with first connector 102. Second connector 104 is here shown with mating interface 130. When first connector 102 and second connector 104 are mated, as shown in FIG. 1, mating interface 130 fits within mating cavity bounded by walls of extender shell 120.

In the embodiment illustrated in FIG. 2B, mating interface 130 has an array of openings. Mating contact portions of conductive elements within second connector 104 are accessible through the openings. In the embodiment illustrated, the mating contact portions of the conductive elements carrying signals within connector 104 are shaped as receptacles, configured to each receive a pin from connector 102. Mating contact portions of ground conductors may also be accessible through the openings in the mating interface 130 such that both conductive elements carrying signals and connected to ground may be connected at the mating interface. In this way, mating the two connectors completes connections between tails exposed at mounting face 106 on the first connector 102 and respective tails exposed at mounting face 108 of the second connector. Thus, when mated, each tail at mounting face 106 may be electrically connected to a corresponding tail at mounting face 108.

Either or both of the first connector and the second connector may be high-density electrical connectors. Mating interfaces 110 and 130 may include, in addition to an array of mating contact portions, an array of structural components. The structural components may be intercalated between elements of the array of mating contact portions. The structural components may provide protection for the mating contact portions, even if the mating contact portions are thin, such as pins used in a high-density connector.

Figure 3A:
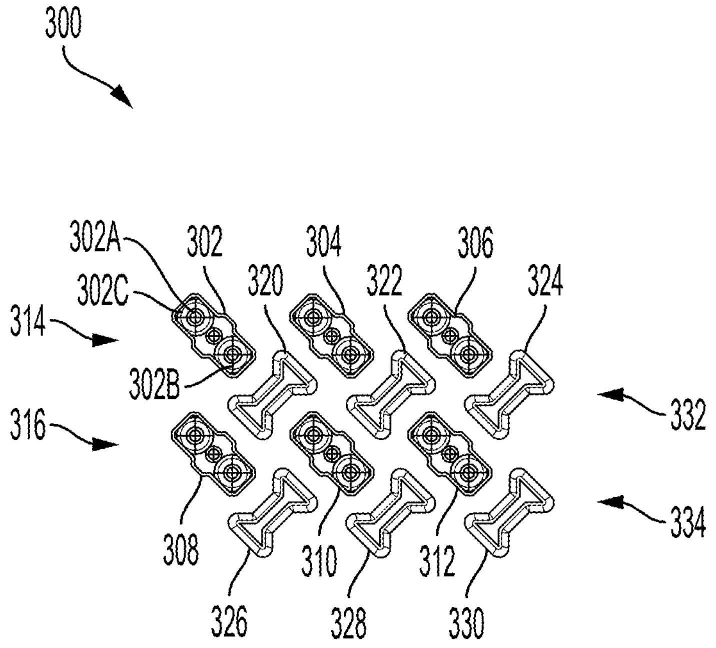
FIG. 3A is a front plan view of a portion of a mating array of a header connector in accordance with some embodiments.

The structural components integrated into the mating interfaces may be projections adjacent groups of mating contact portions or apertures adjacent groups of mating contact portions that receive such projections from a mating connector. FIG. 3A illustrates a portion of a mating array in accordance with some embodiments. FIG. 3A, for example, may represent a portion of mating interface 110 in which mating contact portions extend from the connector housing. In this example, the mating array includes a subarray of mating contact portions and a subarray of structural projections.

The mating contact portions may be arranged in groups, which may be spaced in a plane of mating interface 110. In this example, the groups are uniformly spaced in each of two orthogonal directions, which may be a row direction extending from left to right in the perspective of FIG. 3A and a column direction perpendicular to the row direction. The structural projections in this example are positioned in a subarray with the same spacing in the row and column directions as the groups of mating contact portions. Consequently, for each of the groups of mating contact portions, there is a structural projection adjacent the group. In this example, the relative position of each group of mating contact portions and the adjacent structural projection is the same for all groups.

As shown in the FIG. 3A, mating array 300 includes groups of mating contact portions 302, 304, 306, 308, 310, and 312; and structural projections 320, 322, 324, 326, 328, and 330. In this example, each of the groups of mating contact portions includes a pair of mating contact portions at the ends of signal conductors of a pair of conductive elements serving as signal conductors within the connector. A representative pair of mating contact portions 302A and 302B within group 302 are labeled. Additionally, a group may include mating contact portions of one or more ground conductors. In this example, the mating contact portion of the ground conductor may totally or partially surround the mating contact portions of the pair of signal conductors. A representative mating contact portion 302C of a ground conductor within group 302 is labeled.

In some embodiments, the subarray of mating contact portions may be configured in rows and columns of groups of mating contact portions. For example, in the illustrated embodiment, groups of mating contact portions 302, 304, and 306 are in a first row 314, and groups of mating contact portions 308, 310, and 312 are configured in a second row 316. The subarray of structural projections may be intercalated within the subarray of groups of mating contact portions. For example, the spacing between structural elements 320, 322, and 324 may be comparable with the spacing between groups of mating contact portions 302, 304, and 306 such that the structural projections are intercalated in the spaces between the signal conductors. In the illustrated embodiments, structural projections 320, 322, and 324 may be configured in a first row of structural projections 332, and structural projections 326, 328, and 330 may be configured in a second row of structural projections 334. The structural projections of the first row of structural projections 332 may be between the first row of groups of mating contact portions 314 and the second row of groups of mating contact portions 316. Additionally, the spacing between rows of groups of mating contact portions 314 and 316 may be the same as the spacing between rows of the structural projections 332 and 334. The second row of groups of mating contact portions 316 may be disposed between the first and second rows of structural projections 332 and 334. Thus, in this example, the two subarrays are intercalated where rows and columns of each subarray alternate moving across a row or column.

In the illustrated example, structural element 320 is disposed in the space between groups of mating contact portions 302, 304, 308, and 310. In some embodiments, groups of mating contact portions 308 and 304 may be separated by a gap of a 1 mm to 2 mm. In some embodiments, groups of mating contact portions 302 and 310 may be separated by a gap of 2 mm to 3 mm. In some embodiments, groups of mating contact portions 302 and 310 may be separated by a gap of approximately 1.6 mm. In some embodiments, groups of mating contact portions 308 and 310 may be separated by a gap of approximately 2.5 mm.

In some embodiments, when structural projections are intercalated between the subarray of groups of mating contact portions, a group of mating contact portions may be disposed in the gap between four structural projections. In some embodiments, the group of mating contact portions may be disposed in the gap between four structural projections, where the spacing between structural projections as measured across the gap is between 2 mm-5 mm. For example, with reference to the gap between groups of mating contact portions 320, 322, 326, and 328, the gap may be approximately 3.25 mm between structural projections 320 and 328, and the gap may be approximately 2.13 mm between structural projections 322 and 326.

In some embodiments, the rows of groups of mating contact portions 314 and 316 are configured such that the groups of mating contact portions within the rows may be aligned in columns. For example, in the illustrated embodiment, groups of mating contact portions 302 and 308 may be aligned in a first column of groups of mating contact portions, groups of mating contact portions 304 and 310 may be aligned in a second column of groups of mating contact portions, and groups of mating contact portions 306 and 308 may be aligned in a third column of groups of mating contact portions.

In some embodiments, the rows of structural projections 332 and 334 may be configured such that the structural projections within the rows are aligned in columns. For example, in the illustrated embodiments, structural projections 320 and 326 may be in a first column of structural projections, structural projections 322 and 328 may be in a second column of structural projections, and structural projections 324 and 330 may be in a third column of structural projections.

In some embodiments, the spacing between the first row of groups of mating contact portions 314 and the second row of groups of mating contact portions 316 is the same as the spacing between the first column of groups of mating contact portions and the second column of groups of mating contact portions. In some embodiments, the spacing between rows may be between 2 mm and 3 mm. In some embodiments, the spacing between rows is approximately 2.3 mm.

In some embodiments, the spacing between rows is approximately the same as the spacing between columns. For example, the distance between the center of group of mating contact portions 302 and group of mating contact portions 308 may be equal to the distance between the center of group of mating contact portions 302 and group of mating contact portions 304, where the distances between the centers is approximately 2.3 mm. In other embodiments, the spacing between columns may be larger than the spacing between rows. In yet other embodiments, the spacing between columns may be smaller than the spacing between rows.

As shown in the illustrated embodiment, the spacing between structural projections and groups of mating contact portions may be the same, such that rows of groups of mating contact portions may be separated by the same distance as rows of structural projections. For example, the spacing between rows of groups of mating contact portions may be between 2 mm and 3 mm and the spacing between rows of structural projections may be approximately the same.

In some embodiments, the spacing between the first row of structural projections and the second row of structural projections may be the same as the spacing between the first column of structural projections and the second column of structural projections. For example, the distance between the centers of structural projection 320 and structural projection 326 may be the same as the distance between the centers of structural projection 320 and structural projection 322, where the distances between the centers may be approximately 2.3 mm.

In some embodiments, the mating array 300 may include a density of signal conductors of approximately 36 signal conductors, or more, per 100 $mm^2$ and a density of structural projections of approximately 18, or more, structural projections per 100 $mm^2$.

Figure 3B:
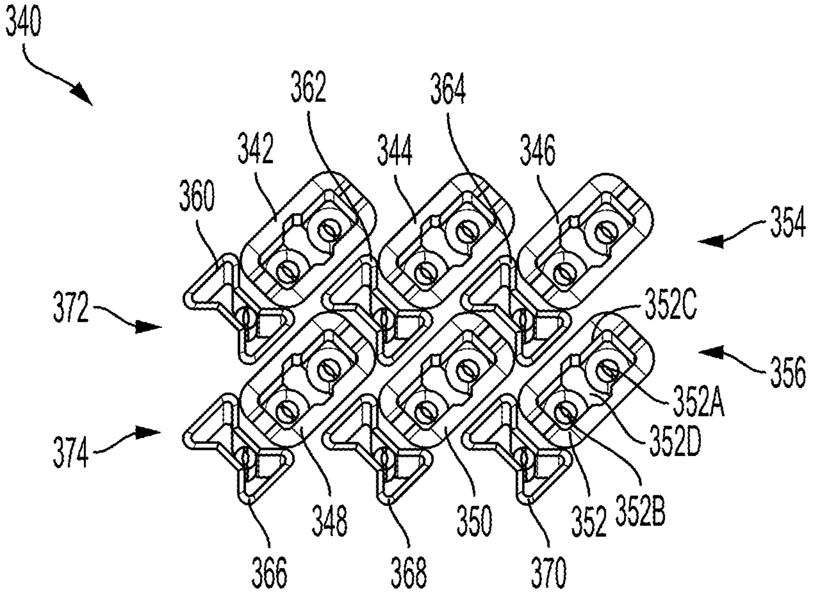
FIG. 3B is a front plan view of a portion of a mating array of a receptacle connector configured to mate with the mating array shown in FIG. 3A, in accordance with some embodiments.

In embodiments in which a first connector 102 is configured to mate with a second connector 104, the second connector 104 may have a mating interface 130 that is complementary to the mating interface 110. FIG. 3B illustrates a portion of a receptacle mating array 340 configured to mate with the mating array shown in FIG. 3A, in accordance with some embodiments. In some embodiments, mating array 340 may include a subarray of groups of mating contact portions and a subarray of apertures. The subarray of groups of mating contact portions may be configured to mate with the mating contact portions illustrated in FIG. 3A, and the apertures may be configured to mate with the structural projections of FIG. 3A. As shown in the FIG. 3B, receiving mating array 340 includes groups of mating contact portions 342, 344, 346, 348, 350, and 352; and apertures 360, 362, 364, 366, 368, and 670. Each of the group of mating contact portions may include mating contact portions at the ends of signal conductors. The mating contact portions of signal conductors may be configured as receptacles that receive the pins of FIG. 3A. Those mating contact portions may be positioned within an opening in a surface of the mating face of the connector housing. A representative pair of mating contact portions 352A and 352B within group 352 are labeled. Mating contact portions 352A and 352B are within an opening 352D in the mating face of the connector.

Additionally, a group may include mating contact portions of one or more ground conductors. In this example, the mating contact portion of the ground conductor may totally or partially surround the mating contact portions of the pair of signal conductors. A representative mating contact portion 352C of a ground conductor within group 352 is labeled. The mating contact portions of 352C of the ground conductor are also within the opening 352D.

In some embodiments, the subarray of groups of mating contact portions may be configured in rows and columns of groups of mating contact portions. For example, in the illustrated embodiment, groups of mating contact portions 342, 344, and 346 may be arranged in a first row of groups of mating contact portions 354. The groups of mating contact portions in the first row of groups of mating contact portions may be configured to mate with the first row groups of mating contact portions 314 of FIG. 3A, such that groups of mating contact portions 342, 344, and 346 receive groups of mating contact portions 306, 304, and 302 respectively. Groups of mating contact portions 348, 350, and 352 may be arranged in a second row of groups of mating contact portions 356. The second row of groups of mating contact portions may be configured to mate with the second row of groups of mating contact portions 334 of FIG. 3A, such that groups of mating contact portions 348, 350, and 352 receive groups of mating contact portions 330, 328, and 326 respectively. The aperture subarray may be intercalated with the subarray of groups of mating contact portions. For example, in the illustrated embodiments, apertures 360, 362, and 364 may be configured in a first row of apertures 372, and apertures 366, 368, and 370 may be configured in a second row of apertures 374. The first row of apertures 372 may be configured between the first row of groups of mating contact portions 354 and the second row of groups of mating contact portions 356. The spacing between the rows of electrical receptacles, 354 and 356, may be the same as the spacing between the rows of apertures 372, and 374. Thus, when mating, apertures 360, 362, 364, 366, 368, and 370 may receive structural projections 324, 322, 320, 330, 328, and 326 respectively.

In some embodiments, mating array 340 may be sized, shaped, and/or configured for mating with a corresponding mating array. Thus, in some embodiments, aspects of the technology described above with reference to mating array 300 of FIG. 3A may also apply to mating array 340.

In some embodiments, the structural projections and corresponding apertures may be sized and shaped to simultaneously satisfy multiple conditions. The structural projections, for example, may be configured to provide clearance around the mating contact portions while also providing structural support to the connector module during mating. Additionally, the structural projections, despite having small features, (e.g., features on the scale of 1-2 mm) may be readily fabricated. For example, for fabrication using injection molding, features on the scale of 1-2 mm may be difficult to form, which may result in structural projections lacking structural integrity sufficient to protect the mating contact portions during mating. Accordingly, each structural projection may have at least one wider portion and at least one narrower portion. The wider portion, for example, may allow for proper flow of material during the process of manufacturing a connector housing including structural projections. The narrower portion may enable the structural projection to fit between closely spaced groups of mating contact portions.

Figure 4A:
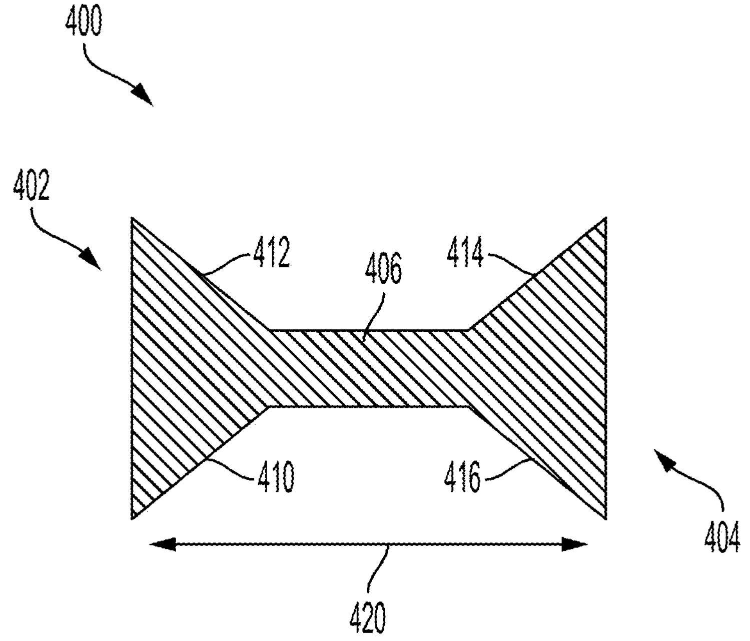
FIG. 4A is a cross sectional view of an exemplary structural projection, in accordance with some embodiments.

FIG. 4A illustrates a cross sectional view of a structural projection, in accordance with some embodiments. In this example, the structural projection has two wider portions at opposing ends of the structural projection and a narrower portion between the wider portions. In some embodiments, the structural projection may be dog bone shaped. The projections may include two wide ends connected by an elongated portion. For example, as shown in FIG. 4A, the cross section of structural projection 400 includes a first wide end 402 and a second wide end 404. An elongated portion 406 extends from the first wide end 402 to the second wide end 404, connecting the two. For some applications, the wide ends may support flow during manufacturing process and the dog bone shape may provide structural advantages, such as increase the mechanical strength of the structural projection in a high-density connector.

In some embodiments, the structural projection is tapered between the wide end and the elongated portion. For example, the cross section of structural projection 400 includes tapered edges 410, 412, 414, and 416. Tapered edges 410 and 412 are disposed between first wide end 402 and the elongated portion 406. Tapered edges 414 and 416 are disposed between the second wide end 404 and the elongated portion 406. For some applications, the tapered shape of the dog bone structure may facilitate flow of a plastic material during a manufacturing process that ensures more efficient space filling.

In some embodiments, the tapered edges 410, 412, 414, and 416 may be straight, as shown in the illustrated embodiment in FIG. 4A. The wide ends and tapered edges may form triangular ends connected by elongated portion 406. In other embodiments, the tapered edges, may be curved. For example, the tapered edges may have convex or concave curvatures between the elongated portion 406 and the wide ends 402 and 414. In yet other embodiments, the wide ends may have other shapes. For example, the wide ends may be rectangular such that the structural projections are dumbbell shaped.

In some embodiments, the structural projections may extend from a surface of an insulative housing component, such as a floor of extender shell 120. The structural projections may extend approximately the same distance about that floor as the mating contact portions of the signal conductors of the connector. For example, the structural projections may extend the same distance as the mating contact portions or up to 20% further.

For example, the height of the structural projections may be between 6 mm and 10 mm. In some embodiments, the height of the structural projection may be approximately 8 mm, as measured from the base of the projection at the surface of the housing to the end of the projection. In some embodiments, the mating contact portions of the signal conductors may extend between 5 mm and 10 mm from the mating interface. In some embodiments, the structural projection may extend between 0.1 mm and 0.5 mm beyond the end of the signal conductors. For example, the signal conductor may extend approximately 7.6 mm from the mating interface along the mating direction and the structural projection may extend approximately 7.9 mm from the mating interface along the mating direction.

In some embodiments, the structural projections may be between 1 mm and 2 mm in length. The length may be measured as the distance between the two wide edges of the structural projection. For example, as shown in FIG. 4A, the length of the structural projection may be measured as the distance between wide end 402 and wide end 404 as measured along line 420.

In some embodiments, the elongated portion of the structural projections may have a width between 0.1 mm and 0.2 mm, as measured perpendicular to the direction of elongation. In some embodiments the elongated portion of the structural projections may have a width of approximately 0.14 mm.

In some embodiments, the elongated portion may be between 0.4 mm and 0.8 mm long. In some embodiments, the elongated portion may be approximately 0.6 mm long. The length of the elongated portion may be measured as the distance between the tapered portions. For example, as shown in FIG. 4A, the length of the elongated portion may be measured as the distance between tapered portions 412 and 414.

Figure 4B:
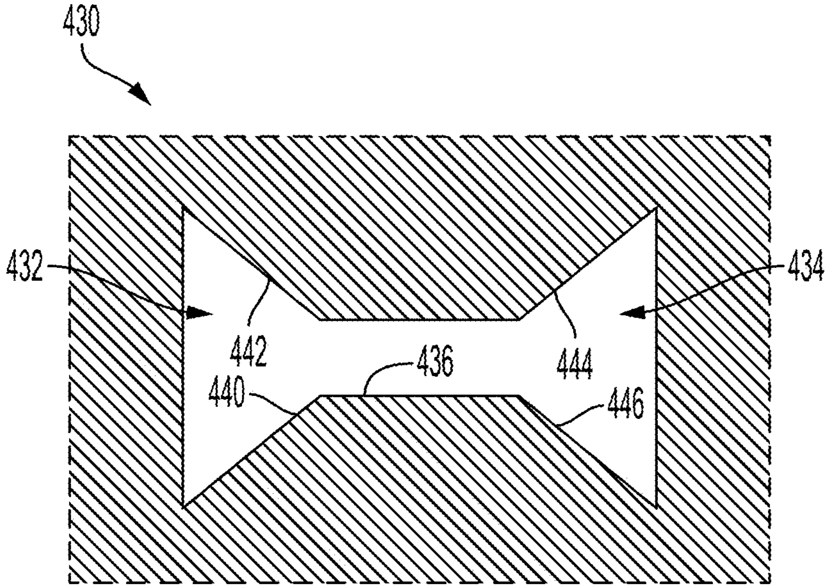
FIG. 4B is a cross sectional view of an exemplary aperture, in accordance with some embodiments.
Figure 8:
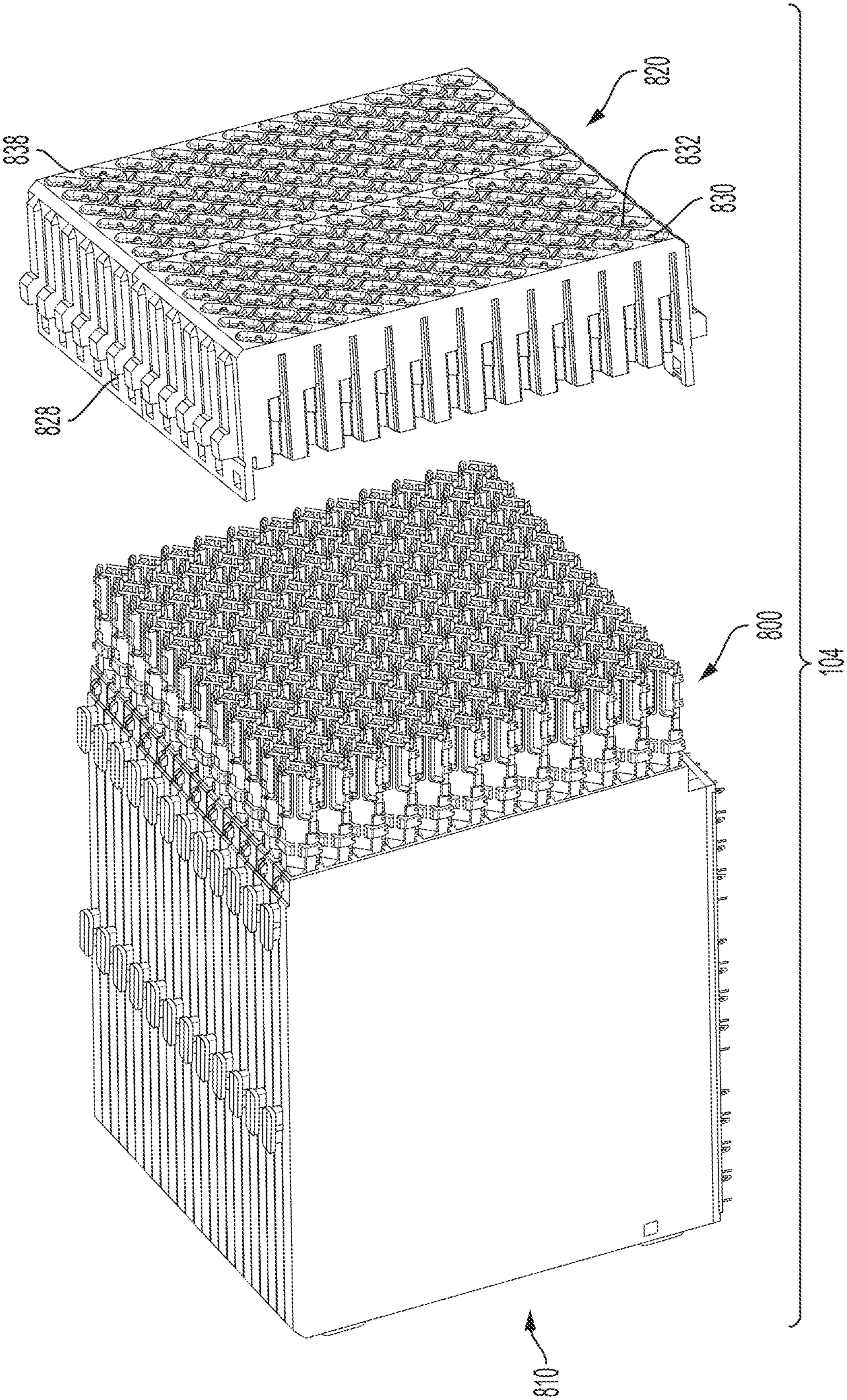
FIG. 8 is a partially exploded view of a receptacle connector with a modular construction, in accordance with some embodiments.

FIG. 4B illustrates a cross sectional view of an aperture, in accordance with some embodiments. The aperture may be formed in a surface of a housing component, such as front housing portion 820 (FIG. 8). The aperture 430 may be configured to mate with the structural projection shown in FIG. 4A. In some embodiments, the aperture may be dog bone shaped. The dog bone shaped aperture may include two wide ends separated by an elongated portion. For example, as shown in FIG. 4B, aperture 430 includes a first wide gap 432 and a second wide gap 434, where an elongated gap 436 extends from the first wide gap 432 to the second wide gap 434 connecting the two spaces.

In some embodiments, the aperture is tapered between the wide gap and the elongated portion. For example, the cross section of aperture 430 includes tapered edges 440, 442, 444, and 446. Tapered edges, 440 and 442 are disposed between the first wide gap 432 and the elongated portion 436. Tapered edges 444 and 446 are disposed between the second wide gap 434 and the elongated portion 436.

In some embodiments, aperture 430 may be sized, shaped, and/or configured for mating with a corresponding structural projection. Thus, in some embodiments, dimensions described above with reference to the structural projection cross section 400 of FIG. 4A may also apply to aperture 430. Aperture 430, however, may be slightly larger than the outer dimensions of the structural projection to reduce friction upon insertion of the structural projection into the aperture.

Figure 5A:
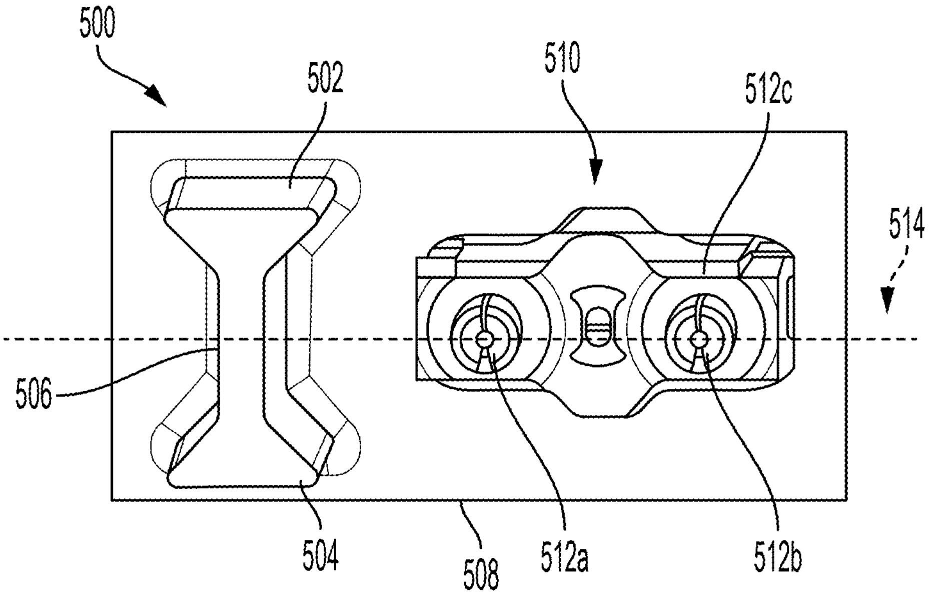
FIG. 5A is a top plan view of a group of mating contact portions and an adjacent structural projection of an exemplary header connector, in accordance with some embodiments.

FIG. 5A illustrates the configuration of a structural projection and an exemplary group of mating contact portions, in accordance with some embodiments. The structural projection may be configured to fit in the gaps between groups of mating contact portions. In some embodiments, the group of mating contact portions may be aligned with the elongated portion of the structural projections. In this example the group of mating contact portions has an elongated axis as does the structural projection. The elongated axis of the group of mating contact portions bisects the structural projection at its elongated axis. In this example, the elongated axis of the group of mating contact portions bisects the structural element at its midpoint. The wide ends of the structural projections may be disposed in the gaps between rows of groups of mating contact portions. For example, structural projection 500 may be a structural projection having a cross section substantially similar to the cross section shown in FIG. 4A. Structural projection 500 may include a first wide end 502 and a second wide end 504 that is connected to the first wide end 502 through an elongated portion 506. In some embodiments, structural projection 500 is disposed adjacent group of mating contact portions 510.

In some embodiments, group of mating contact portions 510 may include two pins, acting as mating contact portions on a pair of signal conductors. For example, group of mating contact portions 510 includes two pins 512*a* and 512*b*. In other embodiments, group of mating contact portions 510 may include a different number of pins. For example, group of mating contact portions 510 may include a single pin. As another example, group of mating contact portions 510 may include three pins. As yet another example, group of mating contact portions 510 may include four or more pins, as aspects of the technology described herein is not limited in this respect.

Alternatively or additionally, each group of mating contact portions may include mating contact portions of ground conductors within the connector. For example, mating contact portions 512*c* of ground conductors may partially surround the pins 512*a* and 512*b*. In this example, the pins extend from a pedestal raised above the surface 508 of a connector housing portion. The mating contact portions 512*c* may be carried by the outer surfaces of the pedestal.

In some embodiments, the pins may be aligned with the elongated portion of the structural projections. In the example of FIG. 5A, the pins 512*a* and 512*b* are aligned along line 514. In some embodiments, the center of the structural projection may be aligned with the pins of the signal conductor. For example, the center of structural projection 500, may be aligned with pins 512*a* and 512*b* along line 514, as shown in FIG. 5A.

In some embodiments, the electrical pins of group of mating contact portions 510 may be configured for differential use. For example, when group of mating contact portions 510 includes an even number of pins, such as two pins or four pins, pairs of the pins may be configured to carry one differential signal. As another example, when group of mating contact portions 510 includes an odd number of pins, such as three pins or five pins, one or more of the pins may be configured as a grounding pin.

Figure 5B:
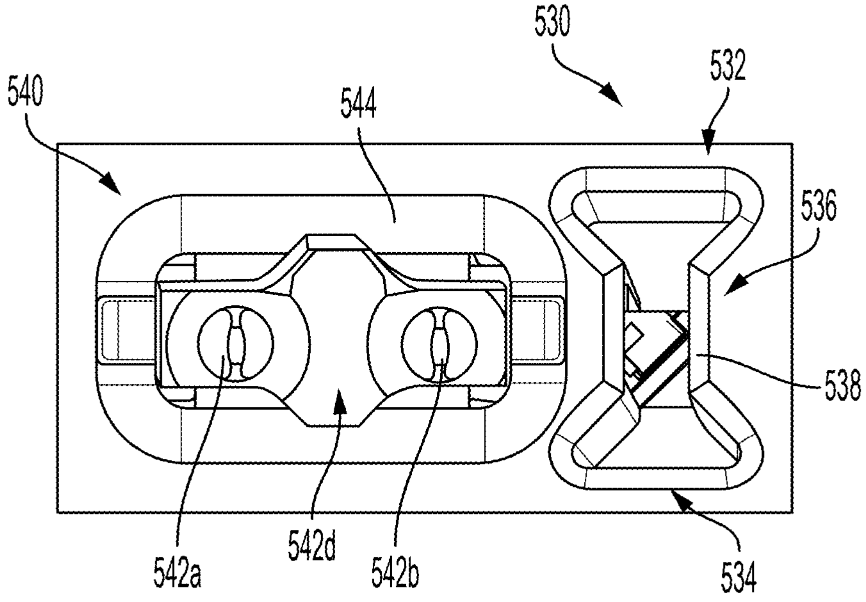
FIG. 5B is a top plan view of a group of mating contact portions and an adjacent aperture of an exemplary receptacle connector, in accordance with some embodiments.

FIG. 5B illustrates the configuration of an aperture and an exemplary group of mating contact portions 542*a* and 542*b* disposed within an opening 542*d* in a connector housing, in accordance with some embodiments. In some embodiments, the group of mating contact portions may be aligned with the elongated gap of the aperture, and the wide ends of the aperture may be disposed in the gaps between rows of group of mating contact portions. For example, aperture 530 may have a cross section substantially similar to the cross section shown in FIG. 4B. Referring again to FIG. 5B, aperture 530 may include a first wide gap 532 and a second wide gap 534 that is connected to the first wide gap 532 through an elongated gap 536. In some embodiments, aperture 532 is disposed adjacent group of mating contact portions 540.

In some embodiments, aperture 530 includes a beveled edge 538 to aid in guiding a structural projection into the aperture during mating. Additionally or alternatively, opening 542*d* may include a beveled edge 544 to aid in guiding a group of mating contact portions from a mating connector into opening 542*d* during mating.

In some embodiments, aperture 530 and/or group of mating contact portions may be sized, shaped, and/or configured for mating with a corresponding structural projection and/or group of mating contact portions, respectively. Thus, in some embodiments, dimensions or relative positions and/or orientations described above with reference to the structural projection and/or group of mating contact portions of FIG. 5A may also apply to aperture 530 and/or group of mating contact portions 540.

In some applications, a connector in which the elongated axis of group of mating contact portions are angled with respect to the rows or columns of the array of group of mating contact portions may provide advantages, such as improved signal integrity. Techniques as described herein facilitate such angled mating interfaces.

Figure 6B:
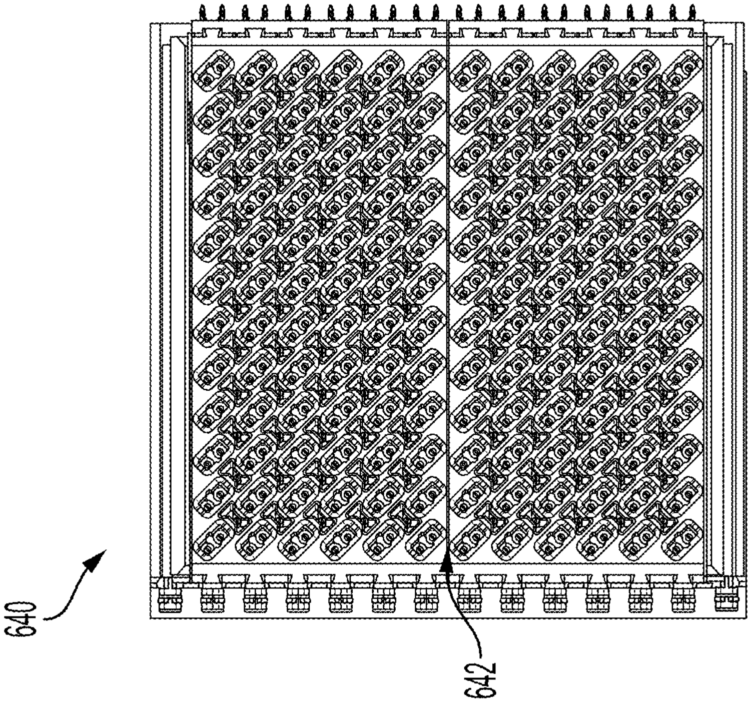
FIG. 6B is a front plan view of the receptacle connector of FIG. 1, in accordance with some embodiments.
Figure 6A:
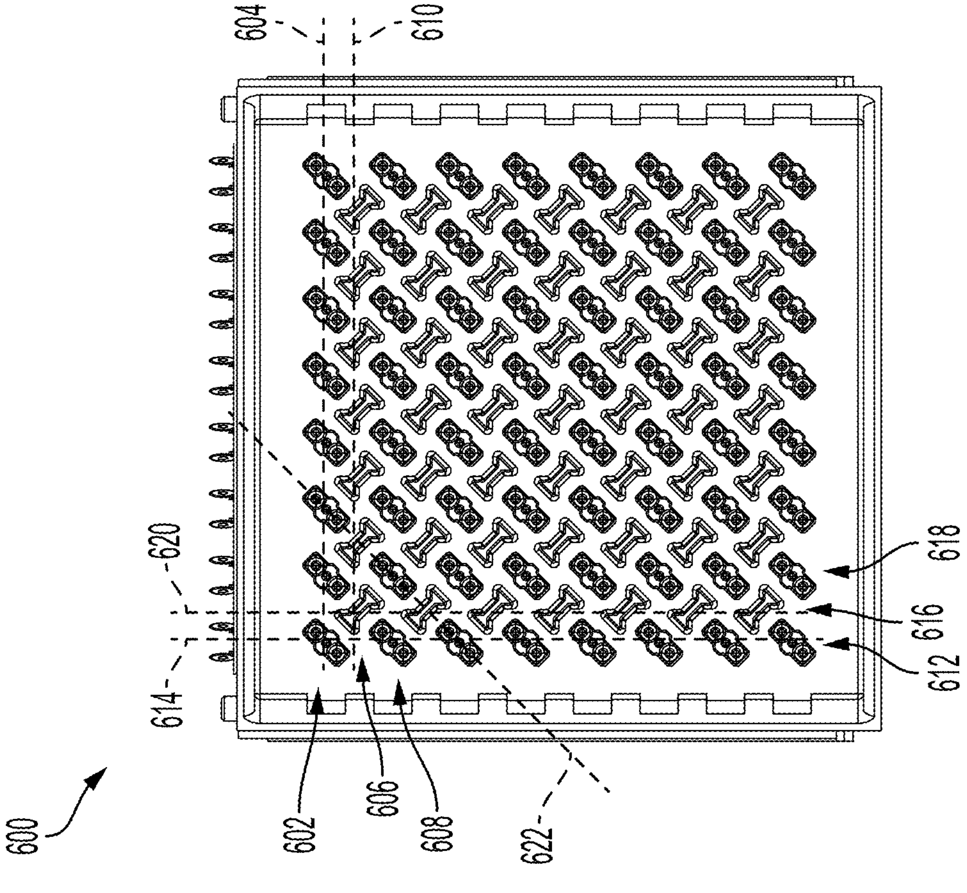
FIG. 6A is a front plan view of a mating interface of a header connector with a different number of rows and columns than the header connector of FIG. 2A, in accordance with some embodiments.

FIG. 6A is a front plan view of the mating interface of a connector, in accordance with some embodiments. In the illustrated embodiment, the signal conductors within the connector are grouped in pairs. The mating ends of pairs of signal conductors at the mating interface may be along a line that is rotated relative to the rows and columns of the mating array. The connector of FIG. 6A has groups of mating contact portions and associated structural projections, each of which may be described in connection with FIG. 3A or 5A, disposed in an array. In this example, that array has a subarray of 8 rows and 8 columns of groups of mating contact portions and a subarray with 7 rows and 7 columns of structural projections.

In some embodiments, connector 600 may include rows and columns of pairs of mating contact portions of the signal conductors and structural projections. The pairs of mating contact portions and structural projections may be configured in alternating rows and/or columns at the mating interface such that the mating array includes an array of pairs of mating contact portions of the signal conductors intercalated with an array of structural projections. For example, pairs of mating contact portions of signal conductors in row 602 are aligned along line 604. Pairs of mating contact portions of signal conductors in other rows may be aligned along lines parallel with line 604. Similarly, structural projections 606 may be positioned between rows of signal conductors. For example, structural projections in row 606 are between rows 602 and 608 and are aligned along line 610, which is parallel with line 604. Additionally or alternatively, columns of structural projections may be between columns of pairs of mating contact portions of signal conductors. For example, column 616 of structural projections is disposed between columns 612 and 618 of pairs of mating contact portions of signal conductors. The columns of pairs of mating contact portions of signal conductors may be aligned along line 614. Pairs of mating contact portions of signal conductors in other columns may be aligned along lines parallel to line 614. Similarly, the columns of structural projections may be aligned along line 620 or other lines that are parallel with line 614.

In some embodiments, the pairs of mating contact portions of signal conductors are rotated relative to the rows and columns of the mating array. For example, the pins of three pairs of mating contact portions of signal conductors are aligned with line 622. Other pairs of mating contact portions of signal conductors may be aligned with lines parallel with line 622. In some embodiments, line 622 may be at an angle between 15 and 75 degrees, or 30 and 60 degrees, or 35 and 55 degrees relative to row line 604. In some embodiments, line 622 is at an angle substantially 45 degrees from row line 604.

In some embodiments, the structural projections may be oriented such that the elongated portions are oriented at an angle between 80 and 100 degrees relative to line 922. In some embodiments, the elongated portions of the structural projections may be oriented orthogonal to line 622, as shown in FIG. 6A.

In some embodiments, the mating array may include more pairs of mating contact portions of signal conductors than structural projections. For a mating array that includes a n×m subarray of pairs of mating contact portions of signal conductors, where n is the number of rows and m is the number of columns of pairs of mating contact portions of signal conductors, the mating array may include a $(n-1)\times(m-1)$ subarray of structural projections. In some embodiments, the mating array may be a square array where n=m. For example, FIG. 6A illustrates a perspective view of the mating interface of a connector with 64 pairs of mating contact portions of signal conductors and 49 structural projections. The 64 pairs of mating contact portions of signal conductors may be arranged in 8 rows and 8 columns, and the 49 structural projections may be arranged in 7 rows and 7 columns intercalated with the signal conductors, as shown in FIG. 6A. In other embodiments, the mating array may be a rectangular array where n: m. In yet other embodiments, other geometries of mating arrays may be used as aspects of the technology described herein are not limited in this respect. In other embodiments, other numbers of pairs of mating contact portions of signal conductors and structural projections may be included in the mating interface.

FIG. 6B illustrates a front plan view of the mating interface of a connector, in accordance with some embodiments. In the illustrated embodiment, the signal conductors within the connector are grouped in pairs. The mating contact portions are configured as receptacles within openings in a face of the connector housing, and that face includes apertures to receive the structural projections of a mating connector, each of which may be described in connection with FIG. 3B or 5B.

In some embodiments, the connector of FIG. 6B may include fewer than (n−1)×(m−1) apertures, for a corresponding n×m array of pairs of mating contact portions of the signal conductors. For example, mating interface 640, shown in FIG. 6B, is configured to mate with a mating interface that includes 144 signal conductors arranged in 12 rows and 12 columns. Receiving mating interface 640 further includes 111 apertures.

In some embodiments, additional separation may be provided between some rows or columns of pairs of mating contact portions to create routing spaces, such as routing spaces 109*a* or 109*b* described in connection with FIG. 1, above. In some embodiments, apertures may be omitted at one or more locations within the array. For example, apertures may be omitted at the periphery of the array or where these routing spaces have been created. For example, along line 642 of mating interface 640, the apertures have been omitted. For applications where some apertures are omitted from the receiving mating interface, the corresponding mating interface should similarly omit structural projections.

In some embodiments, a first connector and a second connector may be manufactured using similar techniques and materials. In some embodiments, the first connector and the second connector may be modular, assembled from units, and some modules or subassemblies of modules may be used in both the first connector and the second, mating connector. For example, a header and a receptacle connector may both have a similar or identical base portion manufactured using similar techniques and materials. An example of a base portion 810 is illustrated in FIG. 8, below. Each of the first connector and the second connector may be configured through the incorporation of additional components that provide different mating interfaces on the first and second connectors, such as a mating interface for a header connector or a mating interface for a receptacle connector. A front housing portion 820 (FIG. 8) may be added over the base portion 810 to form a second connector 104 configured as a receptacle connector. In the illustrated embodiment, the these added components form portions of the connector housing and are made of insulative materials, such as plastic.

To form a first connector with a mating interface complementary to that of second connector, a front housing portion 720 (FIG. 7) may be attached to a similar base portion 810. Extender modules 702 (FIG. 7) may be inserted into the receptacles and held in place with an extender shell 120, such that the first connector is configured to mate with the second connector. In this example, the first connector 102 has a mating interface with mating contact portions of the signal conductors configured as pins extending from a housing of the connector. The second connector 104 has mating contact portions of signal conductors configured as receptacles that receive the pins. The mechanical structure of the mating interface is further set by the shape of extender shell 120. The complementary interface, with openings to receive the pins and to fit within a mating cavity formed in extender shell 120 is set by the shape of front housing portion 720.

Figure 7:
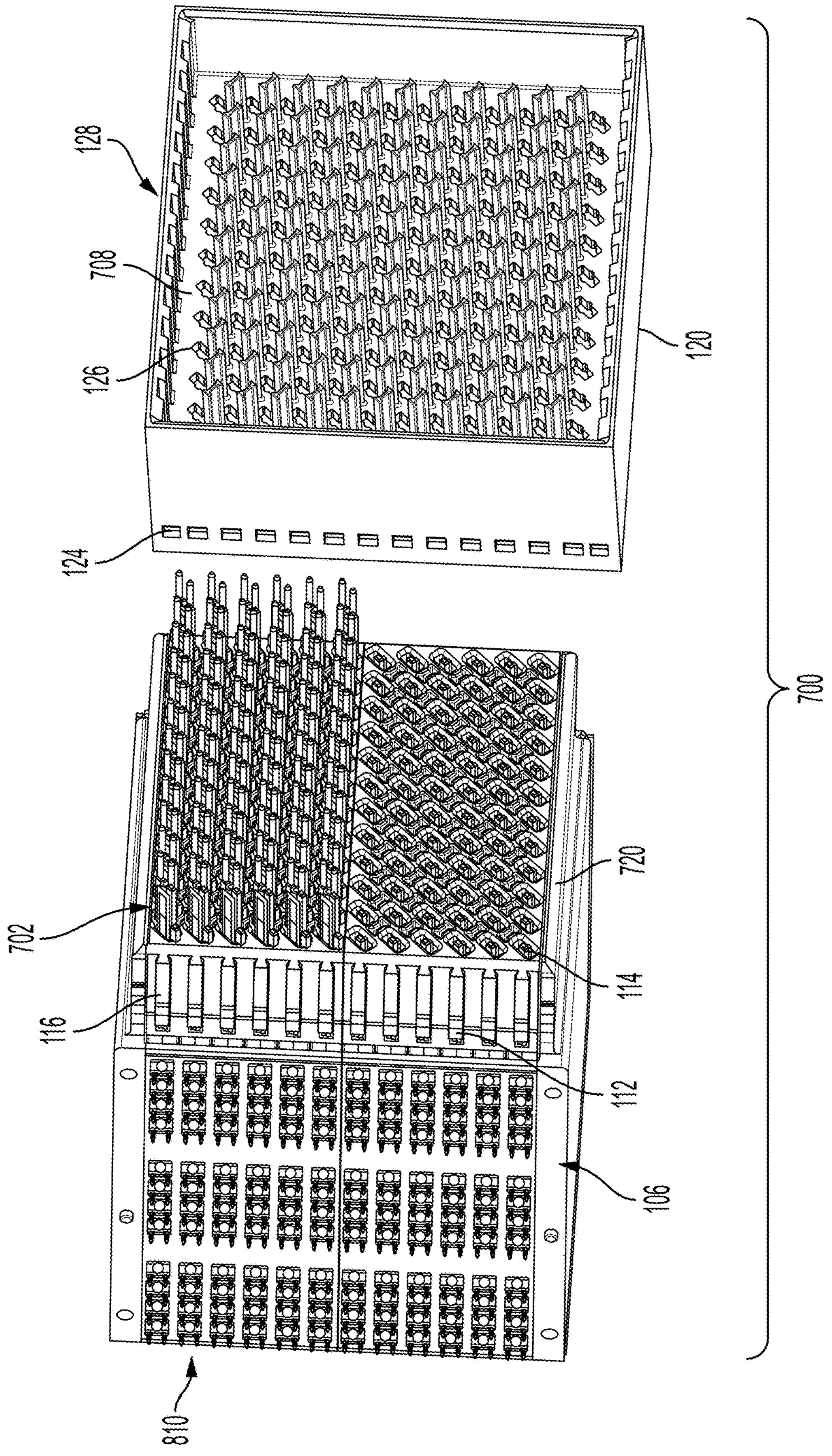
FIG. 7 is a partially exploded view of a header connector 700 with a modular construction, in accordance with some embodiments.

FIG. 7 illustrates a partially exploded view of an electrical connector 700 configured as a header connector and may represent, for example, first connector 102. In some embodiments, electrical connector 700 includes a base 810, a front housing portion 720 and an extender shell 120. Front housing portion has openings in which a group of mating contact portions may be disposed and apertures, which may be as described in connection with FIGS. 3B and 5B, above. The openings with groups of mating contact portions form receptacles 114.

To configure base 810 for use in a header connector, extender modules 702 may be inserted into receptacles 114. In the partially exploded view of a connector module, extender modules 702 are shown inserted into half of the receptacles 114. In some embodiments, extender shell 120 includes openings 126 through a surface serving as floor 708 and aligned with the receptacles 114. When extender modules 702 are inserted into receptacles 114, portions of the extender modules 702 extend through the openings 126 in extender shell 120. The extending portions of the extender module are configured as the mating contact portions of the first connector and are exposed to mate with a second connector. The exposed mating contact portions of the extender modules may form a group of mating contact portions configured as described above in connection with FIGS. 3A and 5A.

Structural projections may be formed as part of a housing portion of connector 700. In this example, they are formed as part of extender shell 120. The structural projections may be formed, for example, as part of the same injection molding operation used to form extender shell 120, such that the structural projections are integrally formed with floor 708 and/or other portions of extender shell 120. The structural projections may be shaped and positioned relative to the groups of mating contact portion as described above.

In some embodiments, extender shell 120 may be polarized. For example, front housing portion 720 may have grooves 116 on at least one side of the connector module. Grooves 116 may interact with complementary features on inside surfaces of extender shell 120 to ensure that extender shell 120 is assembled to front housing portion with the desired orientation.

Extender shell 120 may alternatively include grooves 128 that may polarize the electrical connector 700 to resist attempted mating of two connector modules in a potentially damaging orientation. Tabs of a mating connector, such as tabs 828 (FIG. 8) may fit within grooves 128 when the connectors have the desired orientation. Additionally or alternatively, grooves 128 may act as a guide during mating to resist lateral or twisting motions that could potentially damage components at the mating interface. In some embodiments, grooves may be included on two opposing sides of the connector module. In yet other embodiments, one side or three sides of extender shell 120 may include grooves 128.

In the embodiment illustrated in FIG. 7, front housing portion 720 is configured to support assembly of extender shell 120 to front housing portion 720. Front housing portion 720 includes tabs 112 for engaging apertures 124 in the side of extender shell 120. In some embodiments, extender shell 120 may be configured to flex as it is pressed onto front housing portion 720 such that tabs 112 may slide into apertures 124, where they lock extender shell to front housing portion 720.

FIG. 8 illustrates a partially exploded view of a second connector, such as connector 104. As with connector 102, connector 104 may be assembled from a base 810 to which are attached one or more other components. In this example, a front housing portion 820 is assembled to a base 810 to form a receptacle connector.

In the illustrated embodiment, base 810 includes multiple signal modules 800. In this example, each of the signal modules 800 includes a pair of conductive elements configured for carrying a differential signal. In this example, each of the signal modules 800 has a further conductive element surrounding the pair, which may serve as a ground conductor. In this implementation, the conductive elements of a signal module form, at one end, a group of mating contact portions, such as is described above in connection with FIG. 3B or 5B. Accordingly, the mating interface provided by signal modules 800 may be configured as a receptacle.

In the illustrated embodiment, a front housing portion 820, when assembled to base 810 retains the signal modules 800 in position for mating. The mating contact portions of each signal module 800 is exposed through openings 830 in the front face of front housing portion 820. For example, base 810 may include an array of signal modules 800, and front housing portion 820 may include an array of openings 830 through a front face 838. When assembled, the mating contact portions of the array signal modules 800 is exposed through the array of openings 830.

In some embodiments, the front housing portion 820 may further include an array of apertures 832 in face 838 intercalated with the array of openings 830. The apertures may extend into the face 838. The apertures may be configured to receive structural projections from a mating connector such that, when mated, the structural projections extend into the apertures. The apertures may have a shape and position relative to the groups of mating contact portion as described above.

Figure 9:
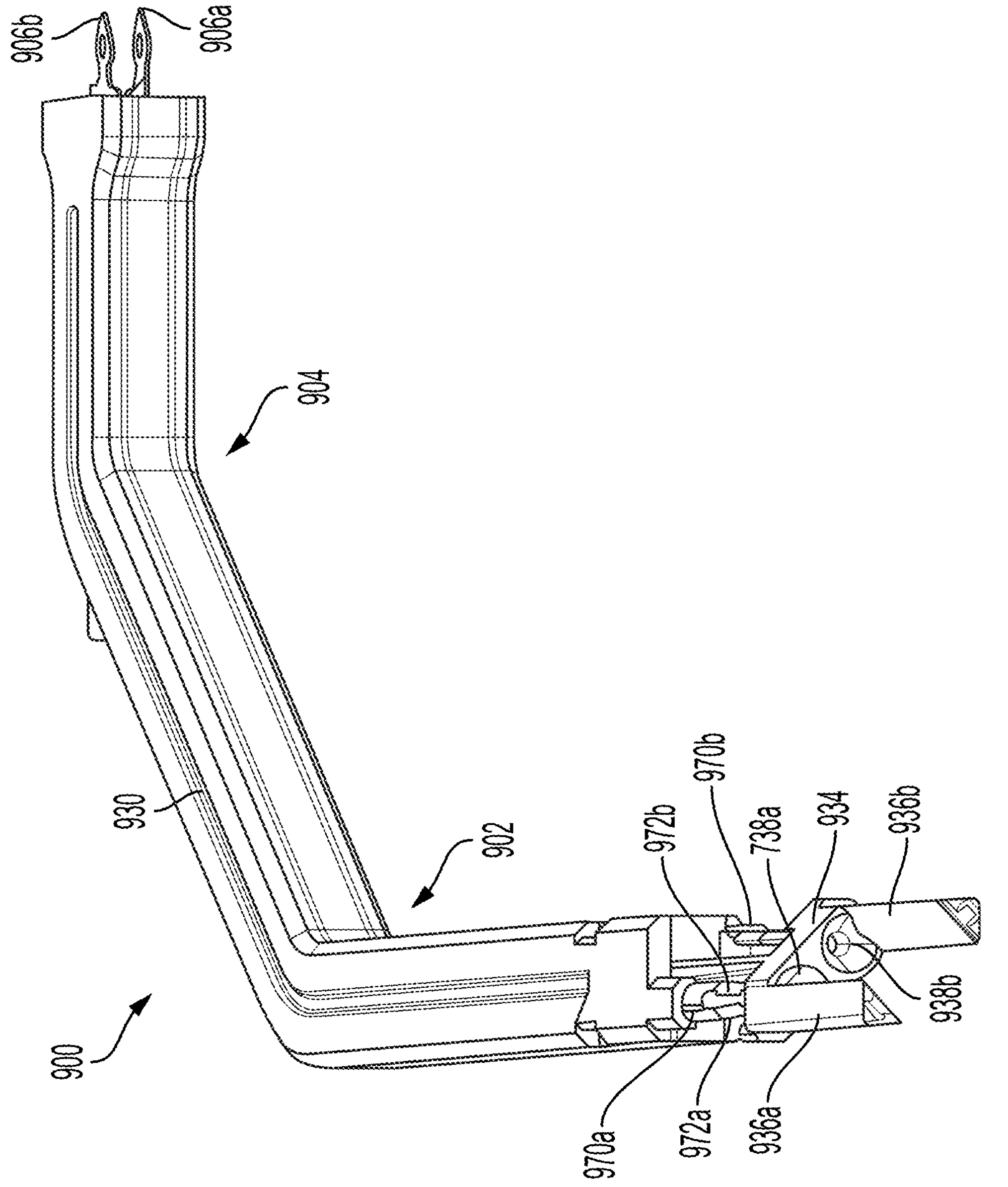
FIG. 9 is a perspective view of a signal subassembly of a signal module, in accordance with some embodiments.

FIG. 9 illustrates a perspective view of a portion of a signal module 800, in accordance with some embodiments. In this example, a signal subassembly 900 is illustrated without conductive elements service as ground conductors. In use, conductive elements may surround the signal subassembly 900, leaving the tails and mating contact portions exposed for making connections to other components within an electronic system.

Insulative member 930 may include signal conductors retained therein, with mating contact portions and tails extending from the insulative member 930. Insulative member 930 may be formed in one or more pieces such that signal conductors may be on the interior.

The signal conductors include an intermediate portion within insulative member 930 connecting the mating contact portions, here configured as receptacles 970*a* and 970*b*, to contact tails 906*a* and 906*b*, respectively. In some embodiments, signal conductors may include multiple bends between the receptacles 970*a* and 970*b* and contact tails 906*a* and 906*b*. For example, as shown in FIG. 9, the signal conductor may include two bends in 902 and 904 that together provide a substantially 90-degree transition in the direction of propagation of the signal conductors.

In some embodiments, compliant receptacles 970*a* and 970*b* are configured to receive, and make contact with, a mating portion of a single conductor of a mating connector between mating arms 972*a* and 972*b*. For example, the receptacles 970*a* and 970*b* are shown configured to receive pins. In the illustrated embodiment, the tails 906*a* and 906*b* are shown as press-fit tails. In other embodiments, other types of tails may be used, such as pressure mount tails, as described above.

In some embodiments, a signal subassembly 900 may include an insulated portion to insulate receptacles 970*a* and 970*b* from each other. The insulative portions may retain receptacles 970*a* and 970*b* and provide apertures through which mating portions of a mating connecter may enter receptacles 970*a* and 970*b*. The insulative portions may be formed as part of insulative member 930. In the illustrated embodiment, insulative member 930 has an extended portion 934, which includes arms 936*a* and 936*b* and apertures 938*a* and 938*b*. Extended portion 934 may extend beyond compliant receptacles 970*a* and 970*b* in the direction along which mating arms 972*a* and 972*b* are elongated. In some embodiments, apertures 938*a* and 938*b* may be configured to receive pins therethrough such that the pins extend into compliant receptacles 970*a* and 970*b*.

In some embodiments, signal subassembly 900 may include conductive elements serving as a ground conductor and/or an outer conductive shield (not shown). The shielding may be shaped similarly to the insulative member 930 and disposed around the insulative member 930. The outer conductive shield may include mating contact portions at one end, adjacent the mating contact portions of the signal conductors as described above, and contact tails at a second end, adjacent the tails of the signal conductors.

In a right-angle connector, such as is shown in FIGS. 7 and 8, the intermediate portions of the signal modules in different rows of the connector may have different lengths. It should be appreciated that the signal modules for each of multiple rows in a connector may be configured by adjusting the length and shape of the intermediate portion of the signal modules. In some embodiments, the mating contact portions and the tails for each signal module, regardless of rows may have the same configuration.

A base 810 may be formed by inserting multiple signal modules 800 into a housing portion, such as portion 220. In some embodiments, signal modules may be assembled in groups and inserted in groups into the housing portion. In some embodiments, for example, signal modules forming one column of pairs of signal conductors may be held together. The groups of signal modules may be held together by overmolding insulative or electrically lossy plastic over the intermediate portions of the modules. Alternatively or additionally, components with features that engage with the signal modules may be molded separately, using insulative or lossy material, and the signal modules may be assembled with the components. These subassemblies may then be inserted into portion 220. In embodiments in which portion 220 is made by die casting, a performance benefit may be achieved by incorporating lossy material into the portion 220 with a conductivity between 10 and 30,000 Siemens/meter. A further efficiency may be achieved by using this lossy material to support groups of signal modules.

In some embodiments, the shielding for each signal module 800 may be isolated from the shielding of other signal conductors. In other embodiments, the outer conductive shielding for some or all of the signal modules may be coupled to a common ground shared by other signal conductor electromagnetic shields. In some embodiments, some or all of that coupling may be through lossy material, as described above.

Figure 10:
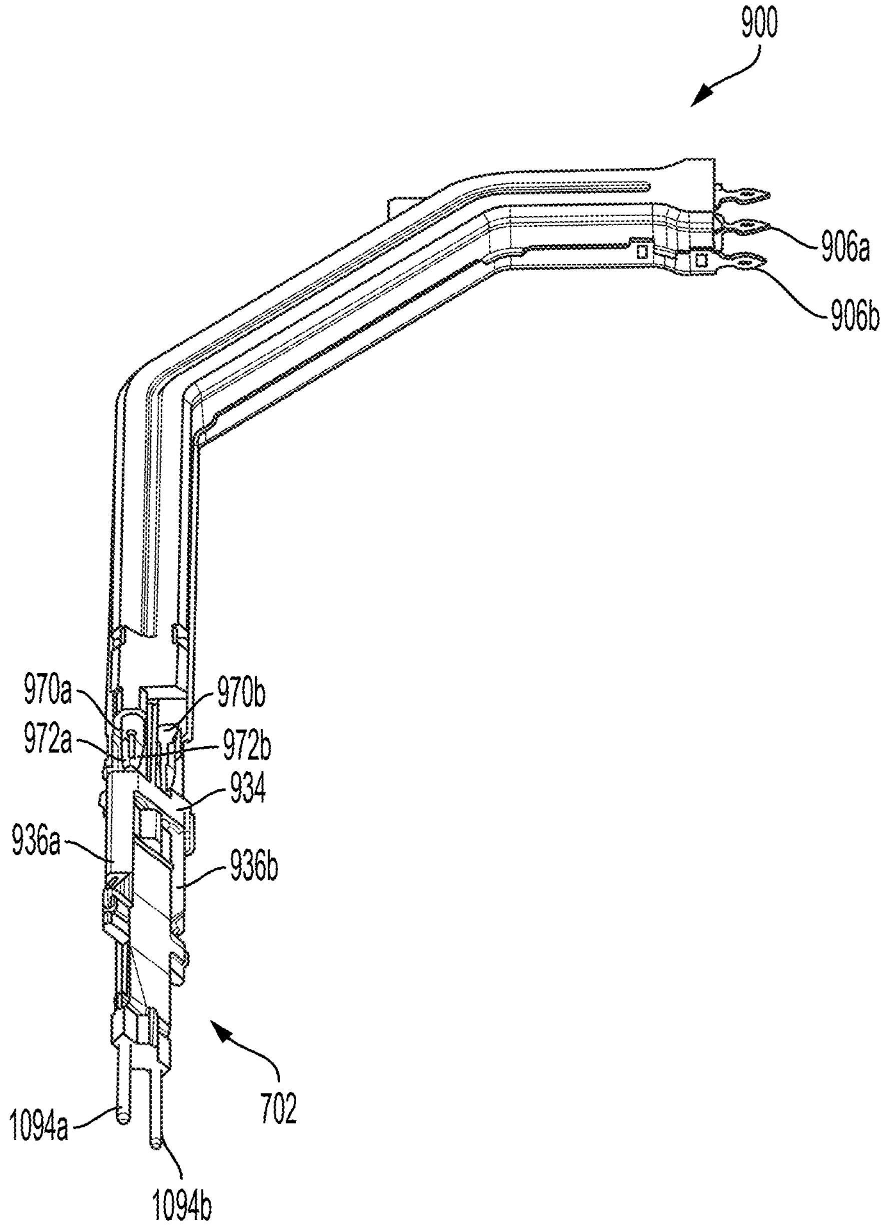
FIG. 10 illustrates a perspective view of signal subassembly with an extender module attached to configure to the signal subassembly for use in a header connector, in accordance with some embodiments.

In the embodiment illustrated, both the first connector and the second connector may be formed from a base 810 with signal modules in which the signal modules have mating contact portions configured as receptacles. Such a base may be modified for use in a header connector by mating an extender module 702 with each of the signal modules 800. FIG. 10 illustrates a perspective view of signal subassembly 900 with an extender module 702 attached, in accordance with some embodiments. Extender module 702 includes mating portions 1004*a* and 1004*b* at an end of extender module 702.

In the illustrated embodiment, each extender module 702, as for a signal subassembly 900, has a pair of signal conductors held within an insulative member. In this case, each end of the extender module is configured to engage with mating contact portions configured as receptacles. In this way, the extender module 702 may engage to the mating interfaces of a base 810 in both the first and second connectors. In this example, both ends of the signal conductors of the extender module 702 may be configured as round conductors, such as pins, that fit into receptacles of signal subassembly 900. For example, mating arms 972*a* and 972*b* may be sized to be deflected upon insertion of pins 1094*a* and 1094*b* into apertures 938*a* and 938*b* to generate a contact force.

As with signal modules 800, extender modules 702 may include ground conductive elements. The ground conductive elements may surround the intermediate portions of the extender modules 702 and may including mating contact portions at each end.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Having thus described several aspects of at least one embodiment, it is to be appreciated that various alterations, modifications, and improvements will readily occur to those skilled in the art. For example, a mating interface with pairs of pins serving as mating contact portions for signal conductors was described. In other implementations, the mating contact portions may have other configurations, such as blades. Alternatively or additionally, the mating contact portions may be disposed in groups of other sizes, with more or less than two mating contact portions per group. The groups, for example, may be single contacts or may have three or more contacts.

As an example of another variation, mating contact portions of ground conductors were described to be around a group of signal conductors. The ground conductors may fully surround, substantially surround or partially surround respective groups of signal conductors. In other implementations, the mating contact portions of the ground conductors may be the same shape as the mating contact portions of the signal conductors.

Further, insulative projections were described at the mating interface adjacent the mating contact portions of groups of signal conductors. In some implementations, insulative projections may alternatively or additionally be positioned adjacent mating contact portions of ground conductors.

As another example, connectors 102 and 104 where each shown to have mating interfaces in which all of the conductive elements of the connector extended from the connector housing or were accessible through an opening of the connector housing. In other implementations, either or both connectors may have multiple types of mating contact portions, including some that extend from the connector housing and others that are accessible through openings in the connector housing. In some embodiments, a connector may have a subset of its mating contact portions extend from the connector housing with structural projections adjacent those mating contact portions and openings through which others of the mating contact portions are exposed. The connector may include apertures, configured to receive structural projections from a mating connector, adjacent the openings.

Further, a first connector and a second connector are described as having modular construction. One or more variations in the connector construction are possible. The interface between a base and an extension module may be separable or a permanent or semipermanent attachment may be used. Further, it is not a requirement that a modular construction be used at all. A header connector and a mating receptacle connector may use unique components.

As a further example, materials may be varied. For example, certain housing portions were described in an exemplary embodiment to be die cast. Those housing portions could be insulative, such as may result from molding the housing portions of plastic. Alternatively, though housing portions may be made of insulative, some or all of the housing components may be made of metal or may be made of lossy material.

Such alterations, modifications, and improvements are intended to be part of this disclosure and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. An electrical connector, comprising:
- a housing comprising a face; and
- a plurality of conductive elements disposed in the housing, wherein:
  - the plurality of conductive elements comprises mating contact portions extending through the face;
  - the plurality of conductive elements is arranged in subsets that are arranged along a plurality of parallel lines at the face;
  - the conductive elements of the subsets that are arranged along a respective same line of the plurality of parallel lines are offset from each other along the respective same line; and
  - the electrical connector further comprises a plurality of projections extending from the face, each of the plurality of projections being disposed between adjacent subsets of the plurality of conductive elements arranged along the respective same lines of the plurality of parallel lines.

2. The electrical connector of claim 1, wherein at least one projection, of the plurality of projections is longer than the plurality of conductive elements.

3. The electrical connector of claim 1, wherein the face is a mating interface and where the electrical connector further comprises a mounting interface at which a cable is terminated to the plurality of conductive elements.

4. The electrical connector of claim 1, wherein:
- the electrical connector is a header connector; and
- the plurality of projections is configured to reduce damage to the mating contact portions extending through the face.

5. The electrical connector of claim 1, wherein:
- the plurality of projections is insulative.

6. The electrical connector of claim 1, wherein the projections of the plurality of projections have a cross section with two ends and a middle section connecting the two ends together, and wherein the middle section is narrower than the two ends.

7. The electrical connector of claim 6, wherein the cross section is dog bone shaped.

8. The electrical connector of claim 6, wherein the cross section is tapered from the two ends to the middle section.

9. The electrical connector of claim 6, wherein:
- each of the subsets of the plurality of conductive elements is held within a respective signal assembly of a plurality of signal assemblies;
- the same line is a first line of the plurality of parallel lines and a second line is another line of the plurality of parallel lines that is adjacent to the first line; and
- the signal assemblies that are arranged along the second line are offset along the second line, relative to the signal assemblies that are arranged along the first line such that a long axis, aligned through centers of the two ends of a projection, of the plurality of projections, centered on the first line, passes through a center of a signal assembly, of the plurality of signal assemblies, arranged along the second line.

10. The electrical connector of claim 1, wherein the face is a mating interface and where the electrical connector further comprises a mounting interface for mounting the electrical connector to a printed circuit board.

11. The electrical connector of claim 10, wherein the mounting interface is in a plane orthogonal to the mating interface.

12. An electronic connector, comprising:

a housing comprising a face with a plurality of openings in the face and a plurality of alignment apertures extending into the face; and a plurality of conductive elements disposed in the housing, wherein:

the plurality of conductive elements comprises mating contact portions exposed through the openings in the face;

the plurality of openings are arranged along a plurality of parallel lines at the face; and wherein alignment apertures of the plurality of alignment apertures are disposed between adjacent openings of the plurality of openings arranged along a same line of the parallel lines.

13. The electronic connector of claim 12, wherein the alignment apertures of the plurality of alignment apertures have a cross section with two ends and a middle spanning the two ends, and wherein the middle is narrower than the two ends.

14. The electronic connector of claim 13, wherein the cross section is dog bone shaped.

15. The electronic connector of claim 13, wherein the cross section is tapered from the two ends to the middle.

16. The electronic connector of claim 13, wherein:

the same line is a first line of the plurality of parallel lines and a second line is another line of the plurality of parallel lines that is adjacent to the first line, and openings that are arranged along the second line are offset along the second line, relative to the openings that are arranged along the first line, such that a long axis, aligned through centers of the two ends of an aperture centered on the first line, passes through a center of an opening arranged along the second line.

17. An electronic system, comprising:

a first connector, comprising:

a first housing comprising a first face;

a first plurality of conductive elements disposed in the first housing, wherein:

the first plurality of conductive elements comprises mating contact portions extending through the first face; and the first connector further comprises a plurality of projections extending from the first face, each of the plurality of projections being disposed adjacent a respective subset of the first plurality of conductive elements; and a second connector mated to the first connector, the second connector comprising:

a second housing comprising a second face;

a second plurality of conductive elements disposed in the second housing, wherein:

the second plurality of conductive elements comprises mating contact portions exposed through openings in the second face; and the second connector further comprises a plurality of apertures extending into the second face, each of the plurality of apertures being disposed adjacent a respective subset of the second plurality of conductive elements, and wherein:

the subsets of the first plurality of conductive elements are mated to the subsets of the second plurality of conductive elements;

the plurality of projections extend into the plurality of apertures; and the plurality of projections and the plurality of apertures are configured with complementary shapes so as to provide fine alignment between the first plurality of conductive elements and the second plurality of conductive elements when the first connector and the second connector are mated.

18. The electronic system of claim 17, wherein mated pairs of the first plurality of conductive elements and the second plurality of conductive elements are disposed in a rectangular array at a face between the first connector and the second connector.

19. The electronic system of claim 17, wherein at least one projection, of the plurality of projections is longer than the plurality of conductive elements.

20. The electronic system of claim 17, wherein cavities, formed by the plurality of apertures extending into the second face, are shaped to fit around side walls of the projections of the plurality of projections.

21. The electronic system of claim 17, wherein the projections of the plurality of projections have a cross section with two ends and a middle section connecting the two ends together, and wherein the middle section is narrower than the two ends.

22. The electronic system of claim 21, wherein the cross section is dog bone shaped.

23. An electrical connector, comprising:

a housing comprising a face; and a plurality of conductive elements disposed in the housing, wherein:

the plurality of conductive elements comprises mating contact portions extending through the face; and the electrical connector further comprises a plurality of projections extending from the face, each of the plurality of projections being disposed adjacent a respective subset of the plurality of conductive elements, wherein each of the plurality of projections has a cross section with two ends and a middle section connecting the two ends together, and wherein the cross section tapers from the two ends to the middle section.

24. The electrical connector of claim 23, wherein the cross section is dog bone shaped.

25. The electrical connector of claim 23, wherein the conductive elements further comprise pins.

26. The electrical connector of claim 25, wherein the plurality of projections is configured to protect the pins during mating.

* * * * *